Jan. 21, 1947. R. F. POST 2,414,787
PREVENTION OF INTERFERENCE FROM OPERATION OF STEP-BY-STEP MOTOR
Filed Jan. 26, 1943
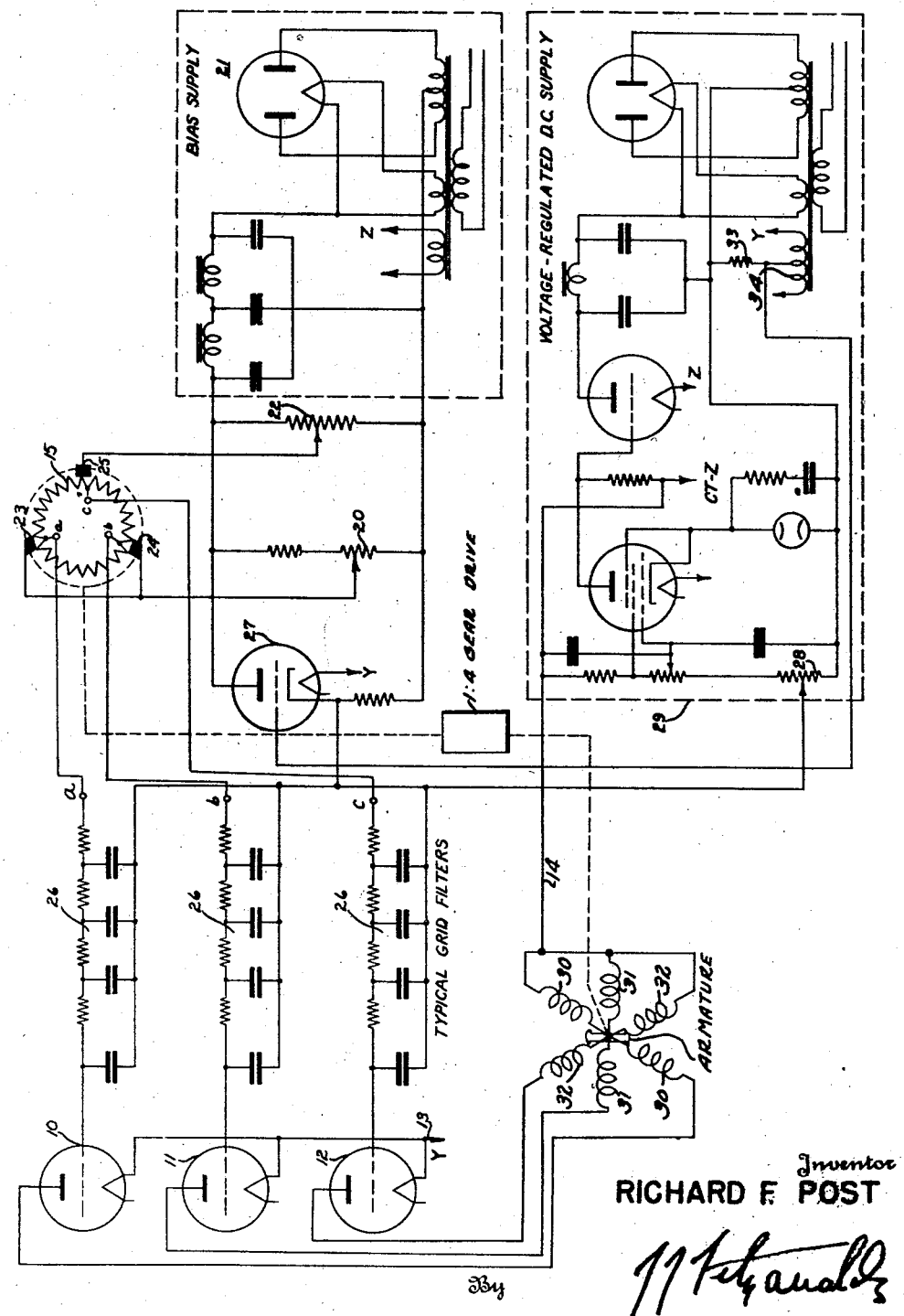
Inventor
RICHARD F. POST
By
Attorney Patented Jan. 21, 1947

2,414,787

UNITED STATES PATENT OFFICE 2,414,787

PREVENTION OF INTERFERENCE FROM OPERATION OF STEP-BY-STEP MOTOR

Richard F. Post, Alexandria, Va.

Application January 26, 1943, Serial No. 473,616

12 Claims. (Cl. 172—239)

(Granted under the act of March 3, 1883, as amended April 30, 1928; 370 O. G. 757)

This invention relates to a device for reducing to a minimum the generation, resulting from the operation of a direct current motor or similar device, of radiations of such a nature as to interfere with nearby sensitive radio equipment.

A typical motor of the class referred to has three separate windings, each returned to a common lead. Operation is obtained by connecting the source of D.-C. power to the windings in the following sequence: #1, #1 and #2, #2, #2 and #3 and #3, thus completing a cycle which in the case of the motor under consideration corresponds to 90° rotation. The sequence may be taken in either direction, at any speed up to the "following" speed of the motor, or may be stopped at any time, to provide complete control over the motor rotation.

The practice followed heretofore with such motors employed a commutating switch to provide the above sequence. Since the pulses generated by such a device are of a "square wave" type, they comprise many high frequency components constituting sources of interference with sensitive instruments, and which can be filtered out only with extreme difficulty.

It is an object of the present invention to provide a means for producing a form of sequential variation of current flow in the windings of a step-by-step motor which will be substantially free from high frequency components.

Another object is to provide such a means which will cause the variation in current flow in each of said windings to occur smoothly and gradually.

It is another object to provide such a means which will maintain substantially constant the current flow in the motor common lead.

Other objects will become apparent from a careful consideration of the following description when taken together with the accompanying drawing, in which the single figure is a schematic wiring diagram of a motor control device embodying the invention.

The circuit illustrated comprises three triode vacuum tubes 10, 11 and 12, the anode of each one being connected respectively to one of the three motor windings 30, 31 and 32. Their filaments or cathodes are connected by the lead 13 to the point Y on the negative side of the D.-C. supply which is shown in the dashed line box 29. The positive side of this supply is connected by a lead 14 to the motor common. The power supply, being conventional, is not described. The amount of current flowing in any given winding can now be controlled by varying the grid bias on the respective tube connected to this winding.

In order to vary the currents in the motor windings in the sequence noted above, and so operate the motor, the grid bias voltages must also be varied in a manner to provide such a sequence. This is accomplished by means of a continuous circular resistor 15, either made as a continuous resistor element as shown, or made up from many smaller resistances connected in series and also to the bars of a commutator.

In the case of a three-winding motor such as is being described by way of example, the three grids of the tubes are tapped to the circular resistor at points 120° apart, such as the points $a$, $b$ and $c$. Next a brush system is arranged with three brushes 23, 24 and 25, 120° apart, two of the brushes 23 and 24, being connected together and the third insulated from the other two. The two connected brushes are connected to a source of negative bias voltage, of value sufficient to produce cut-off in the particular type tube employed. The source of bias voltage in this case is shown as a potentiometer 20 across the output leads of a bias supply source 21. To the third brush 25 is connected an amount of positive potential equal to or slightly less than the negative bias in magnitude. This potential is derived from a potentiometer 22 in parallel with potentiometer 20.

If the brushes are now rotated around the circular resistor the bias on any one tube will vary from cut-off to the voltage of the brush 25 and back to cut-off again through an arc of 240° rotation. The currents in individual windings, as controlled by the varying grid biases, will follow the sequence given above.

In the motor being used as an example, the brush assembly would have to rotate four times as fast as the motor. This could be accomplished by a conventional geared drive from the motor.

Small fluctuations in the bias voltage applied to the tubes, due to the use of several small resistors in series in the circular resistor, may be reduced or nearly eliminated by the use of multisection, resistance-capacity filters as indicated at 26, whose component resistances may be very high since no grid currents are drawn by the tubes.

In addition it is desirable to maintain the current in the motor common lead at an essentially constant value. This may be accomplished by the use of a modified bridge network in which another vacuum tube, such as tube 27, forms one arm of the bridge. The cathode and grid of this tube are connected to the opposite sides of resistance 33 connected to the center tap of secondary winding 34 in the power supply. The bias on tube 27 thus varies in accordance with the amount of current in the motor common lead 14. For example, an increase in current in lead 14 increases the potential difference across resistance 33 and renders more negative the cathode of tube 27 with respect to its grid. This lowers the D.-C. plate resistance of the tube, resulting in increased flow of plate current and a lowering of the potential on brushes 23, 24 and 25. Maintenance of constant or nearly constant current in the common lead helps to insure a minimum of generated interference.

In operation the action of the above described circuit in causing the motor currents to rise and fall smoothly without sharp discontinuities and in the maintenance of an essentially constant current in the motor common, contributes greatly to the operation of a step-by-step D.-C. motor with a minimum of generated interference.

It should be understood that the practice of the invention is not limited to the embodiment illustrated and described but is circumscribed only by the scope and limitations of the appended claims.

The invention described herein may be manufactured and used by or for the Government of the United States of America for governmental purposes without the payment of any royalties thereon or therefor.

I claim:

1. In an energy transforming system comprising a direct current motor having a plurality of windings, means for energizing said windings in sequence, with the production of a minimum of interfering radiation, said means comprising an electronic tube in circuit with each of said windings, means for energizing said tubes, a control grid in each of said tubes and operable to vary the output thereof as a function of the bias voltage applied to it, a source of bias voltage and means applying said voltage to said grids, in sequence, and during each application uniformly varying the amplitude of said voltage from a value to cause blocking of said tube to a value sufficient to cause a desired maximum output thereof.

2. In an energy transforming system comprising a direct current motor having a plurality of windings, means for energizing said windings in sequence, with the production of a minimum of interfering radiation, comprising a source of electrical energy, electronic means for governing the flow of said energy into said windings and means operated in synchronism with said motor to vary the output of said electronic means in a manner to uniformly vary the rate of flow of said energy between desired limits to each of said windings, said variation of flow being applied to said windings sequentially.

3. Means to prevent the generation of interfering radiations due to the operation of a direct current motor having a plurality of windings, which operation requires the sequential energization of said windings; said means comprising an electronic tube in circuit with each of said windings, a source of direct current voltage connected across said tubes and means applying a uniformly varying voltage from said source to each of said tubes in sequence to vary the output thereof as a function of said uniformly varying voltage, said voltage varying from a value to cause blocking of said tube to a value sufficient to cause a desired maximum output of said tube.

4. Means to prevent the generation of interfering radiations due to the operation of a direct current motor having a plurality of windings, which operation requires the sequential energization of said windings; said means comprising an electronic tube in circuit with each of said windings, a source of direct current connected across said tubes, a source of bias voltage for said tubes and means applying said bias to each of said tubes in sequence in a uniformly varying manner to cause the output of said tubes to vary in accordance therewith, from a value to cause blocking of said tube to a value sufficient to cause a desired maximum output of said tube.

5. Means to prevent the generation of interfering radiations due to the operation of a direct current motor having a plurality of windings, which operation requires the sequential energization of said windings; said means comprising an electronic tube in circuit with each of said windings, a source of direct current voltage for energizing said windings connected across said tubes, a control electrode in each of said tubes and operable to vary the output thereof as a function of the bias voltage applied to it, a circular resistance element, a source of bias voltage having a value low enough to hold the output of said tubes to a desired minimum, a source of bias voltage having a value high enough to increase the output of said tubes to a desired maximum, tapping points arranged at 120° intervals about said resistance element, means connecting said low bias source to two of said tapping points, means connecting said high bias source bias to the other of said tapping points, separate brush means connected to each of said control electrodes, said brushes being arranged at 120° intervals about said resistance element and in contact therewith and means to rotate said brushes with respect to said resistance element, in synchronism with the rotation of said motor.

6. Means for preventing the generation of interfering radiations due to the operation of a direct current motor as claimed in claim 5, said means including an electronic tube connected across said bias sources, a common return for said motor windings, and means applying to said tube a bias varying inversely with current flow in said common return.

7. Means to prevent the generation of interfering radiations due to the operation of a direct current motor having a plurality of windings, which operation requires the sequential energization of said windings; said means comprising an electronic tube in circuit with each of said windings, a source of direct current voltage connected across said tubes, a source of bias voltage for said tubes, means applying said bias to each of said tubes in sequence in a manner to cause the output of said tubes to be a function thereof, and uniformly varying the value of said bias between desired limits during its application to each of said tubes.

8. Means to prevent the generation of interfering radiations due to the operation of a direct current motor having a plurality of windings, as claimed in claim 7, including a common return for said motor windings, an electronic tube connected across said bias source and means applying to said tube a bias voltage varying inversely with current flow in said common return.

9. Means to prevent the generation of interfering radiations due to the operation of a direct current motor having a plurality of windings, which operation requires the sequential energization of said windings; said means comprising an electronic tube in circuit with each of said windings, a source of direct current voltage connected across said tubes, a source of bias voltage having a desired low value, a source of bias voltage having a desired high value, means applying bias voltage from said sources to each of said tubes in sequence in a manner to cause the output of said tubes to be a function thereof, and uniformly varying the value of said bias voltage between said low and high values, during its application to each of said tubes.

10. Means to prevent the generation of interfering radiations due to the operation of a direct current motor having a plurality of windings, as claimed in claim 9, including a common return for said motor windings, an electronic tube connected across said bias sources and means applying to said tube a bias voltage varying inversely with current flow in said common return.

11. Means to prevent the generation of interfering radiations due to the operation of a direct current motor having a plurality of windings, as claimed in claim 7, including a common return for said motor windings, and means applying across said source of bias voltage a voltage varying inversely with current flow in said common return.

12. Apparatus as claimed in claim 2 including a common return for said motor windings, and means responsive to the flow of current in said common return for additionally varying the output of said electronic means in inverse relation to the rate of said flow of current.

RICHARD F. POST.